UNITED STATES PATENT OFFICE

2,378,739

STABILIZER FOR POLYVINYL CHLORIDE COMPOSITIONS

George H. Taft, Hudson, Ohio, assignor to The B. F. Goodrich Company, New York, N. Y., a corporation of New York No Drawing. Application October 15, 1941, Serial No. 415,084

9 Claims. (Cl. 260—88)

This invention relates to a stabilizer which maintains the dielectric strength of plasticized polyvinyl chloride compositions at a high value over a long period of time, and pertains specifically to a method for the preparation of insoluble silicate stabilizers.

Insoluble metal silicates, in particular lead and silver silicates and the alkaline earth metal silicates, have been used in the past to increase the electrical resistivity of plasticized vinyl chloride polymer compositions, and to maintain the resistivity at a high value over a long period of time.

I have now discovered that the resistivities of compositions made from polyvinyl chloride or copolymers of vinyl chloride with minor proportions of other polymerizable monomers such as vinyl acetate, vinyl propionate, or other vinyl esters, vinyl cyanide, vinylidene chloride, and the like, may be greatly increased by incorporating in the plasticized polymer composition small quantities of insoluble metal silicates which have previously been washed with a large amount of water to remove small amounts of soluble impurities. This washing may be accomplished by any of the ordinary methods. The silicate may be dispersed, for example, in three to ten times its weight of water, and after settling for a few hours the solid may be separated by filtration, or the supernatant water may be simply decanted. Optimum results are secured by repetition of this operation four or five times, although a definite improvement is noticeable even after one treatment. The washing may also be carried out as a continuous process, using a countercurrent stream of water. Either distilled water or ordinary tap water may be used, although, in general, distilled water gives somewhat better results.

The separation of the insoluble silicates from the water is frequently difficult. Silicates which have been ground to a fine particle size or which have been prepared by precipitation tend either to pass through or to plug up the finest filter cloth, and do not settle completely even after standing several days. I have found that the coagulation of the silicate is facilitated by increasing the ionic concentration in the aqueous dispersion medium. However, not all ionic materials produce a silicate which is a satisfactory electrical stabilizer. In most cases the addition of a small amount of electrolyte to the dispersion to coagulate the silicate yields a product having very little effect on the electrical properties of the vinyl resin composition in which it is incorporated. Only the water-soluble barium and lead compounds are effective as coagulating agents without being destructive of the stabilizing effect of the silicate on vinyl resins. Among the materials which may be used are barium oxide, barium hydroxide, barium chloride, barium nitrate, barium acetate, lead acetate, lead chloride, lead nitrate, and the like. As little as 10 parts of the electrolyte per million of water are effective in obtaining a separation of the silicates, although optimum settling and filtering rates are obtained with concentrations of about 100 parts per million.

As a specific example of my invention I have washed a sample of lead silicate, prepared by mixing solutions of sodium silicate and lead acetate, with ordinary tap water. A ratio of about 10 parts of water to one of lead silicate was used, and the dispersion, after thorough mixing, was allowed to settle 3 to 15 hours. The supernatant liquid, about one-third to one-half of that orginally added, depending upon the length of time it was allowed to settle, was then removed by siphoning and an equal amount of fresh water added. This operation was repeated several times. After the twelfth wash a part of the sludge was filtered. This operation was found to be extremely slow; however, after 100 P. P. M. of barium acetate was added to the remainder of the suspension, the precipitate was collected very readily on the filter. Samples obtained at various steps of the process were then dried at 105° and 110° C. and milled into the following recipe in which the parts are by weight: 100 parts gamma-polyvinyl chloride; 52 parts of dioctyl phthalate; and 10 parts of lead silicate. After molding at 297° C., the specific resistivity of the sample was measured at 70° C., as noted below.

| Sample | No. of washings | Coagulant | Resistivity at 70° C. ohm-cm. × $10^9$ |
|---|---|---|---|
| 1 | 0 | None | 58 |
| 2 | 12 | do | 1,730 |
| 3 | 12 | Barium acetate | 2,020 |

It is clear from this data that the process of washing the stabilizer produces an unexpected and very large increase in the effectiveness of silicate stabilizers. Similar results may be obtained with other insoluble silicates.

The stabilizers of my invention may be used in any amount in the polymer composition; as little as 0.5% produces an appreciable effect, but usually it is desirable to use 5 to 15%. Any of the ordinary plasticizers, such as tricresyl phosphate, dioctyl phthalate, dibutyl phthalate, and the like, as well as any of the pigments, fillers, and dyes in common use in the rubber or plastics industry may also be present in the composition.

Although I have herein disclosed specific embodiments of my invention, I do not intend to limit myself thereto, but to include in the appended claims all the obvious variations and modifications.

I claim:

1. A composition of matter having high dielectric strength comprising gamma-polyvinyl chloride and lead silicate which has been dispersed in water, coagulated with barium oxide, and dried.

2. A method of increasing the dielectric strength of plasticized gamma-polyvinyl chloride compositions which comprises incorporating therein lead silicate which has been dispersed in water, coagulated with barium oxide, and dried.

3. A composition of matter having high dielectric strength comprising gamma-polyvinyl chloride and lead silicate which has been dispersed in water, coagulated with lead acetate, and dried.

4. A composition of matter having high dielectric strength comprising gamma-polyvinyl chloride and lead silicate which has been dispersed in water, coagulated with barium acetate, and dried.

5. A method of increasing the dielectric strength of plasticized gamma-polyvinyl chloride compositions which comprises incorporating therein lead silicate which has been dispersed in water, coagulated with lead acetate, and dried.

6. A method of increasing the dielectric strength of plasticized gamma-polyvinyl chloride compositions which comprises incorporating therein lead silicate which has been dispersed in water, coagulated with barium acetate, and dried.

7. A composition of matter having high dielectric strength comprising a polymer in which the predominant constituent is vinyl chloride, and lead silicate which has been dispersed in water, coagulated with a member of the class consisting of water-soluble compounds of lead and water-soluble compounds of barium, and dried.

8. A composition of matter having high dielectric strength comprising gamma-polyvinyl chloride and lead silicate which has been dispersed in water, coagulated with a member of the class consisting of water-soluble compounds of lead and water-soluble compounds of barium, and dried.

9. A method of increasing the dielectric strength of plasticized compositions comprising polymers in which the predominant constituent is vinyl chloride which comprises incorporating therein lead silicate which has been dispersed in water, coagulated with a member of the class consisting of water-soluble compounds of lead and water-soluble compounds of barium, and dried.

GEORGE H. TAFT.